(12) United States Patent
Tsujita et al.

(10) Patent No.: US 11,411,648 B2
(45) Date of Patent: Aug. 9, 2022

(54) OPTICAL TRANSMISSION SYSTEM AND ELECTRO-OPTICAL CONVERSION DEVICE

(71) Applicants: NITTO DENKO CORPORATION, Osaka (JP); Yasuhiro Koike, Kanagawa (JP)

(72) Inventors: Yuichi Tsujita, Osaka (JP); Takeshi Tanaka, Osaka (JP); Satoshi Ito, Osaka (JP); Keita Kiyoshima, Osaka (JP); Atsushi Yamagishi, Osaka (JP); Yasuhiro Koike, Kanagawa (JP); Azusa Inoue, Tokyo (JP)

(73) Assignees: NITTO DENKO CORPORATION, Osaka (JP); YASUHIRO Koike, Kanagawa (JP)

( * ) Notice: Subject to any disclaimer, the term of this patent is extended or adjusted under 35 U.S.C. 154(b) by 0 days.

(21) Appl. No.: 17/312,705

(22) PCT Filed: Nov. 28, 2019

(86) PCT No.: PCT/JP2019/046625
§ 371 (c)(1),
(2) Date: Jun. 10, 2021

(87) PCT Pub. No.: WO2020/121833
PCT Pub. Date: Jun. 18, 2020

(65) Prior Publication Data
US 2022/0045756 A1    Feb. 10, 2022

(30) Foreign Application Priority Data

Dec. 11, 2018 (JP) .............................. JP2018-231520
Apr. 25, 2019 (JP) .............................. JP2019-084189

(51) Int. Cl.
*H04B 10/00* (2013.01)
*H04B 10/2575* (2013.01)
(Continued)

(52) U.S. Cl.
CPC ......... *H04B 10/2575* (2013.01); *H04B 10/50* (2013.01); *H04B 10/66* (2013.01); *H04J 14/02* (2013.01)

(58) Field of Classification Search
CPC .... H04B 10/2575; H04B 10/50; H04B 10/66; H04B 10/40; H04B 10/502;
(Continued)

(56) References Cited

U.S. PATENT DOCUMENTS 4,933,929 A * 6/1990 Tajima ................ H04J 14/0221
398/186
5,548,402 A * 8/1996 Nogiwa .............. H01S 5/06258
356/477

(Continued)

FOREIGN PATENT DOCUMENTS

CN            1447539 A     10/2003
CN         101039161 B     10/2011
(Continued)

OTHER PUBLICATIONS

International Preliminary Report on Patentability issued by WIPO dated Jun. 8, 2021, in connection with International Patent Application No. PCT/JP2019/046625.
(Continued)

*Primary Examiner* — Hibret A Woldekidan
(74) *Attorney, Agent, or Firm* — Jean C. Edwards, Esq.; Edwards Neils LLC

(57) ABSTRACT

An optical transmission system transmits a Radio Frequency (RF) signal by a frequency division multiplexing method. The optical transmission system includes a Transmitter Optical SubAssembly (TOSA), an optical fiber, and a Receiver Optical SubAssembly (ROSA). The TOSA includes a surface emitting laser diode configured to be capable of emitting light at output of 0.8 mW or more. In the
(Continued)

optical transmission system including the surface emitting laser diode, a noise index obtained by a measurement method including a predetermined step is 10.0 dBµV or less.

10 Claims, 7 Drawing Sheets

(51) Int. Cl.
    *H04B 10/50*     (2013.01)
    *H04B 10/66*     (2013.01)
    *H04J 14/02*     (2006.01)

(58) Field of Classification Search
    CPC ........... H04B 10/25759; H04B 10/1143; H04J 14/02; H04L 12/10; H04L 27/2276
    USPC .................... 398/115, 116, 140, 141, 79, 162
    See application file for complete search history.

(56) References Cited

U.S. PATENT DOCUMENTS

| | | | |
|---|---|---|---|
| 6,271,942 B1 * | 8/2001 | Sasai | H04B 10/564 398/9 |
| 8,315,524 B2 | 11/2012 | Zhang et al. | |
| 2002/0075909 A1 * | 6/2002 | Kasamatsu | H01S 3/094003 359/341.1 |
| 2003/0161637 A1 | 8/2003 | Yamamoto et al. | |
| 2004/0047578 A1 * | 3/2004 | Fukuda | C03C 23/0025 385/129 |
| 2005/0201713 A1 | 9/2005 | Sato | |
| 2006/0228117 A1 | 10/2006 | Takeuchi et al. | |
| 2018/0041281 A1 | 2/2018 | Koiwai | |

FOREIGN PATENT DOCUMENTS

| | | |
|---|---|---|
| JP | H06-085373 A | 3/1994 |
| JP | H08-018537 A | 1/1996 |
| JP | H08-274714 A | 10/1996 |
| JP | H10-215223 A | 8/1998 |
| JP | 2004-035412 A | 2/2004 |
| JP | 2005-216530 A | 8/2005 |
| JP | 2005-260713 A | 9/2005 |
| JP | 2012-109760 A | 6/2012 |
| JP | 5039825 B2 | 10/2012 |
| JP | 2014-053879 A | 3/2014 |
| JP | 5448510 B2 | 3/2014 |
| JP | 2014-168223 A | 9/2014 |
| JP | 2015-025867 A | 2/2015 |
| JP | 5977211 B2 | 8/2016 |
| JP | 2018-023050 A | 2/2018 |
| JP | 2018-041957 A | 3/2018 |
| WO | 2005/088877 A1 | 9/2005 |

OTHER PUBLICATIONS

International Search Report Issued in PCT/JP2019/046625 dated Feb. 10, 2020.
Written Opinion Issued in PCT/JP2019/046625 dated Feb. 10, 2020.
Office Action, issued by the State Intellectual Property Office dated Dec. 3, 2021, in connection with Chinese Patent Application No. 201980082269.X.
Office Action, which was issued by the Korean Intellectual Property Office dated Sep. 13, 2021, in connection with corresponding Korean Patent Application No. 10-2021-7017799.

* cited by examiner

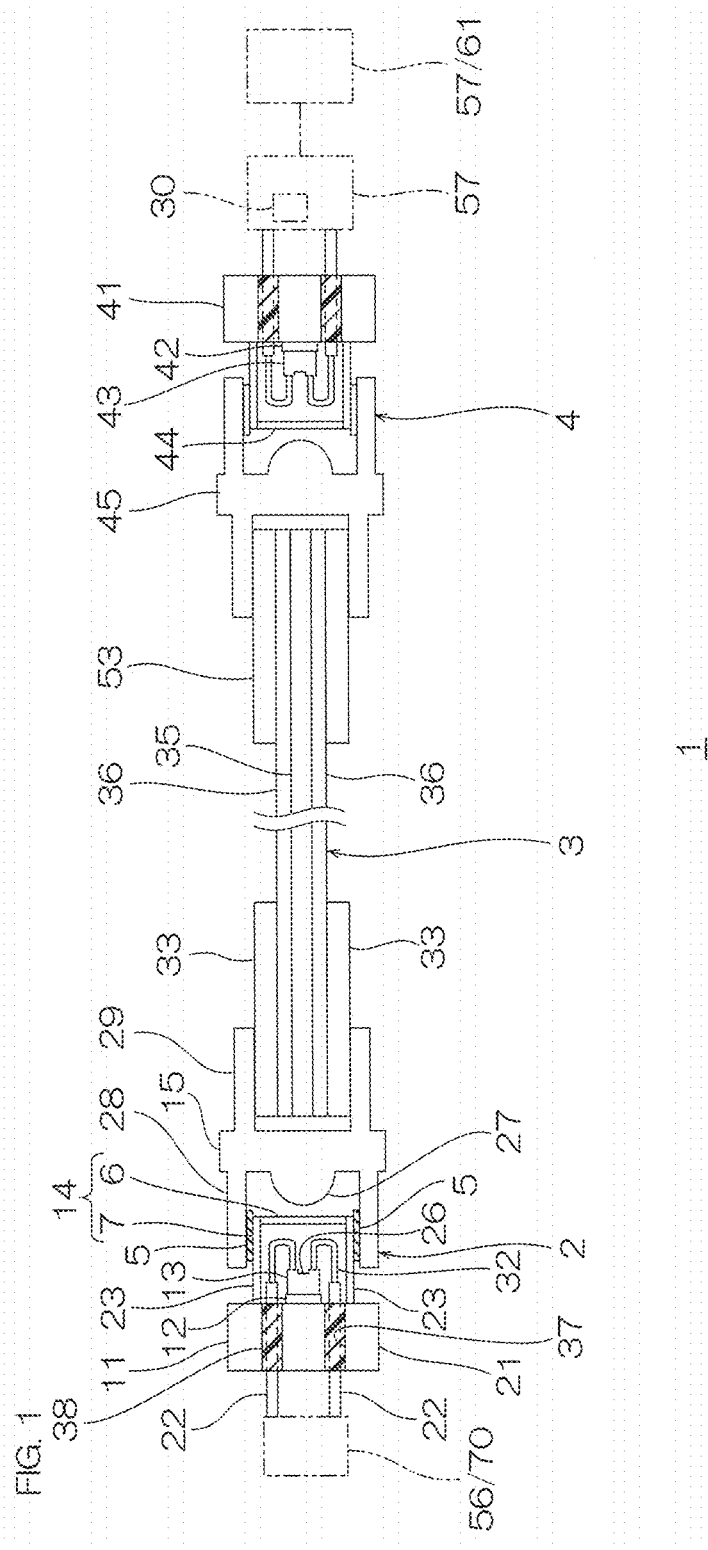

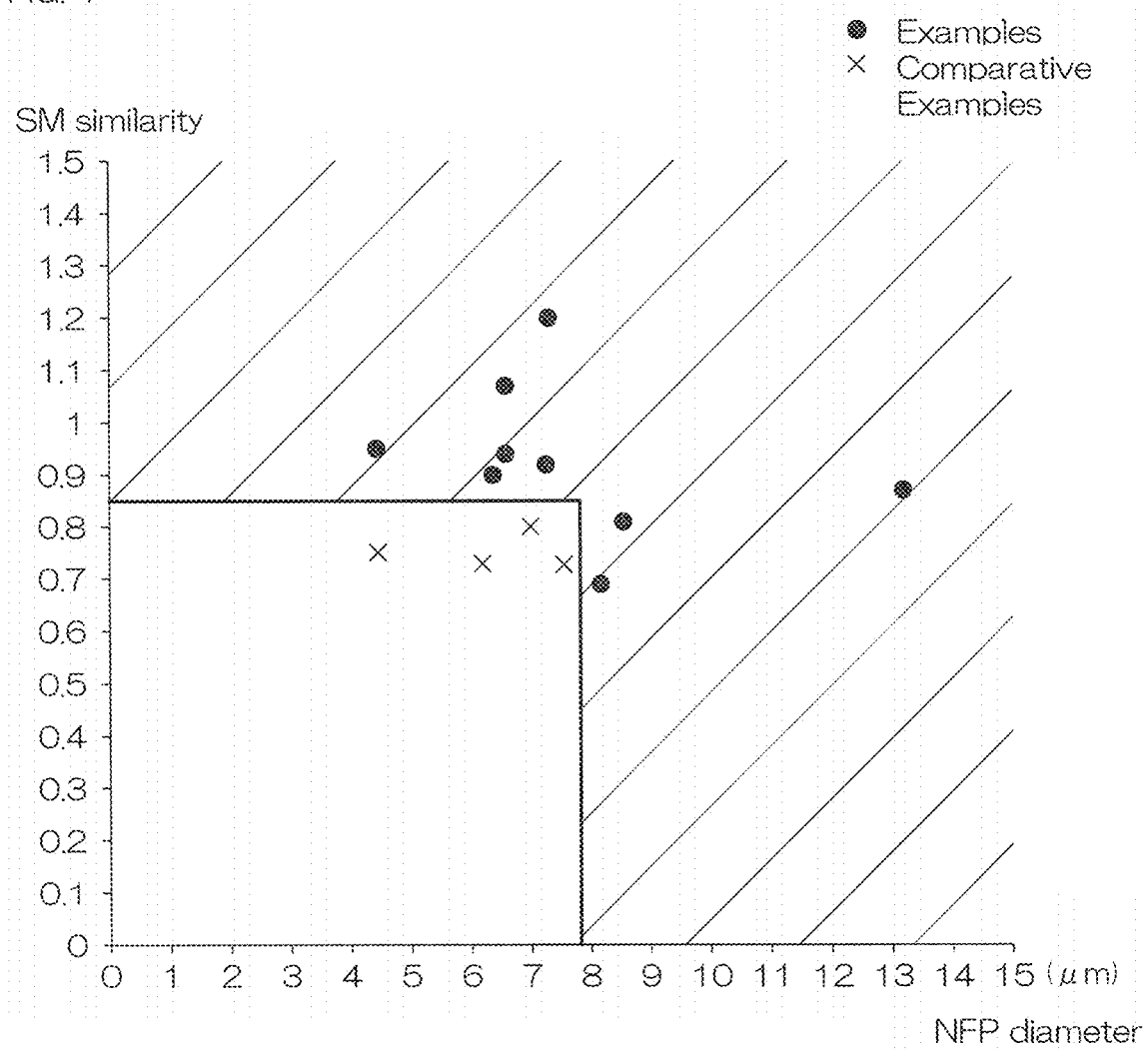

OPTICAL TRANSMISSION SYSTEM AND ELECTRO-OPTICAL CONVERSION DEVICE

CROSS-REFERENCE TO RELATED APPLICATIONS

The present application is a 35 U.S.C. 371 National Stage Entry of: PCT/JP2019/046625, filed on Nov. 28, 2019, which claims priority from Japanese Patent Application Nos. 2018-231520, filed on Dec. 11, 2018, and 2019-084189, filed on Apr. 25, 2019, the contents of all of which are herein incorporated by reference in their entirety.

TECHNICAL FIELD

The present invention relates to an optical transmission system and an electro-optical conversion device.

BACKGROUND ART

An optical transmission system in which a TV-RF signal such as radio waves of television broadcasting is converted into an optical signal to be transmitted by an optical fiber, and the optical signal is converted into a TV-RF signal has been known (ref: for example, Patent Document 1 below.).

In Patent Document 1, the optical transmission system includes an electro-optical conversion device for converting an RF signal into an optical signal.

CITATION LIST

Patent Document

Patent Document 1: Japanese Unexamined Patent Publication No. 2014-53879

SUMMARY OF THE INVENTION

Problem to be Solved by the Invention

However, there is a demand to secure a long transmissible distance in the optical transmission system.

Therefore, in Patent Document 1, in order to satisfy the above-described demand, it is tentatively proposed that emission output of the electro-optical conversion device is increased.

On the other hand, when the emission output of the electro-optical conversion device is increased, a noise floor of the emission output of the electro-optical conversion device is increased, and therefore, there is a problem that a communication error is increased.

The present invention provides an optical transmission system and an electro-optical conversion device capable of suppressing a communication error while securing a long transmissible distance.

Means for Solving the Problem

The present invention (1) includes an optical transmission system for transmitting an RF signal by a frequency division multiplexing method including an electro-optical conversion device for receiving an RF signal, converting the RF signal into an optical signal, and transmitting the optical signal, an optical transmission line for transmitting the optical signal transmitted from the electro-optical conversion device, and an opto-electrical conversion device for converting the optical signal transmitted from the optical transmission line into an RF signal and transmitting the RF signal, wherein the electro-optical conversion device includes a light source capable of emitting light at output of 0.8 mW or more, and a noise index obtained by a measurement method including the following first to sixth steps is 10.0 dBµV or less.

First step: a constant current source is connected to the electro-optical conversion device at the upstream side in a transmission direction thereof, and a frequency analyzer is connected to the opto-electrical conversion device at the downstream side in the transmission direction thereof.

Second step: a constant current is input from the constant current source to the electro-optical conversion device, and at the same time, an electrical signal input from the opto-electrical conversion device is analyzed with the frequency analyzer, and a waveform having a frequency on the horizontal axis and the intensity on the vertical axis is acquired with the frequency analyzer 3000 times in a frequency domain of 10 MHz to 3.5 GHz of the electrical signal every 0.02 seconds after the elapse of 60 seconds from the beginning of the input of the electrical signal by the constant current source, so that a baseline which is an average waveform of 3000 times is obtained.

Third step: a waveform is obtained 3000 times with the frequency analyzer every 0.02 seconds from the beginning of the input of the electrical signal by the constant current source, and a maximum intensity graph drawn as the maximum value of the intensity at each frequency in the 3000 waveforms is obtained.

Fourth step: a graph obtained by subtracting the intensity of the baseline from the intensity of the maximum intensity graph is drawn with the frequency analyzer.

Fifth step: an average value of the intensity for each specific frequency obtained by dividing the graph into 1000 in the frequency domain is calculated with the frequency analyzer.

Sixth step: a value obtained by subtracting the average value from the maximum intensity in the graph with the frequency analyzer is obtained as a noise index (unit: dBµV).

The present invention (2) includes an optical transmission system for transmitting an RF signal by a frequency division multiplexing method including an electro-optical conversion device for receiving an RF signal, converting the RF signal into an optical signal, and transmitting the optical signal, an optical transmission line for transmitting the optical signal transmitted from the electro-optical conversion device, and an opto-electrical conversion device for converting the optical signal transmitted from the optical transmission line into an RF signal and transmitting the RF signal, wherein the electro-optical conversion device includes a light source capable of emitting light at output of 0.8 mW or more, and a beam diameter (FWHM: full width at half maximum) obtained by near-field pattern measurement of the light source is 7.8 µm or more, or SM (single mode) similarity of the light source obtained by a measurement method including the following seventh to eleventh steps is 0.85 or more.

Seventh step: a constant current source is connected to the light source, and a light receiving portion of a near-field pattern measurement device is disposed in a position where the most light emitted from the light source enters the light receiving portion.

Eighth step: a constant current is input from the constant current source to the light source, and a beam diameter (FWHM) and a near-field pattern (intensity distribution) of the light source are measured with the near-field pattern measurement device after the elapse of 60 seconds to 180 seconds from the beginning of the input of an electrical signal by the constant current source and obtained.

Ninth step: an average value of the intensity in a circle with the center of gravity of the intensity distribution of the near-field pattern as the origin (0, 0), and having a diameter of the beam diameter (FWHM) with the origin as a center in the near-field pattern is calculated.

Tenth step: an average value of the intensity in a circle having a diameter of 1 μm with the origin (0, 0) as a center in the near-field pattern is calculated.

Eleventh step: the SM similarity is calculated by dividing the average value calculated in the tenth step by the average value calculated in the ninth step.

The present invention (3) includes the optical transmission system described in (1) or (2), wherein a wavelength band of an optical signal emitted from the light source is 1100 nm or less.

The present invention (4) includes the optical transmission system described in any one of (1) to (3), wherein the light source is a surface emitting laser diode.

The present invention (5) includes the optical transmission system described in any one of (1) to (4), wherein the light source has a specification of 50 Mbps or more and 20 Gbps or less.

The present invention (6) includes the optical transmission system described in any one of (1) to (5), wherein the RF signal is a BS signal, a CS signal, a CA-TV signal, and/or a terrestrial signal.

The present invention (7) includes an electro-optical conversion device in an optical transmission system for transmitting an RF signal by a frequency division multiplexing method, the optical transmission system for transmitting including: the electro-optical conversion device for receiving an RF signal, converting the RF signal into an optical signal, and transmitting the optical signal; an optical transmission line for transmitting the optical signal transmitted from the electro-optical conversion device; and an opto-electrical conversion device for converting the optical signal transmitted from the optical transmission line into an RF signal and transmitting the RF signal, wherein the RF signal is capable of being converted into an optical signal, the electro-optical conversion device includes the light source includes a light source capable of emitting light at output of 0.8 mW or more, and a noise index obtained by a measurement method including the following first to sixth steps is 10.0 dBμV or less.

First step: a constant current source is connected to the electro-optical conversion device at the upstream side in a transmission direction thereof, and a frequency analyzer is connected to the opto-electrical conversion device at the downstream side in the transmission direction thereof.

Second step: a constant current is input from the constant current source to the electro-optical conversion device, and at the same time, an electrical signal input from the opto-electrical conversion device is analyzed with the frequency analyzer, and a waveform having a frequency on the horizontal axis and the intensity on the vertical axis is acquired with the frequency analyzer 3000 times in a frequency domain of 10 MHz to 3.5 GHz of the electrical signal every 0.02 seconds after the elapse of 60 seconds from the beginning of the input of the electrical signal by the constant current source, so that a baseline which is an average waveform of 3000 times is obtained.

Third step: a waveform is obtained 3000 times with the frequency analyzer every 0.02 seconds from the beginning of the input of the electrical signal by the constant current source, and a maximum intensity graph drawn as the maximum value of the intensity at each frequency in the 3000 waveforms is obtained.

Fourth step: a graph obtained by subtracting the intensity of the baseline from the intensity of the maximum intensity graph is drawn with the frequency analyzer.

Fifth step: an average value of the intensity for each specific frequency obtained by dividing the graph into 1000 in the frequency domain is calculated with the frequency analyzer.

Sixth step: a value obtained by subtracting the average value from the maximum intensity in the graph with the frequency analyzer is obtained as a noise index (unit: dBμV).

The present invention (8) includes an electro-optical conversion device in an optical transmission system for transmitting an RF signal by a frequency division multiplexing method, the optical transmission system for transmitting including the electro-optical conversion device for receiving an RF signal, converting the RF signal into an optical signal and transmitting the optical signal, ;an optical transmission line for transmitting the optical signal transmitted from the electro-optical conversion device; and an opto-electrical conversion device for converting the optical signal transmitted from the optical transmission line into an RF signal and transmitting the RF signal, wherein the RF signal is capable of being converted into an optical signal, the electro-optical conversion device includes a light source capable of emitting light at output of 0.8 mW or more, and a beam diameter (FWHM: full width at half maximum) obtained by near-field pattern measurement of the light source is 7.8 μm or more, or SM (single mode) similarity of the light source obtained by a measurement method including the following seventh to eleventh steps is 0.85 or more.

Seventh step: a constant current source is connected to the light source, and a light receiving portion of a near-field pattern measurement device is disposed in a position where the most light emitted from the light source enters the light receiving portion.

Eighth step: a constant current is input from the constant current source to the light source, and a beam diameter (FWHM) and a near-field pattern (intensity distribution) of the light source are measured with the near-field pattern measurement device after the elapse of 60 seconds to 180 seconds from the beginning of the input of an electrical signal by the constant current source, and obtained.

Ninth step: an average value of the intensity in a circle with the center of gravity of the intensity distribution of the near-field pattern as the origin (0, 0), and having a diameter of the beam diameter (FWHM) with the origin as a center in the near-field pattern is calculated.

Tenth step: an average value of the intensity in a circle having a diameter of 1 μm with the origin (0, 0) as a center in the near-field pattern is calculated.

Eleventh step: the SM similarity is calculated by dividing the average value calculated in the tenth step by the average value calculated in the ninth step.

The present invention (9) includes the electro-optical conversion device described in (7) or (8), wherein a wavelength band of an optical signal emitted from the light source is 1100 nm or less.

The present invention (10) includes the electro-optical conversion device described in any one of (7) to (9), wherein the light source is a surface emitting laser diode.

Effect of the Invention

According to the optical transmission system of the present invention including the electro-optical conversion device of the present invention, since the electro-optical conversion device includes a light source capable of emitting light at output of 0.8 mW or more and a noise index is 10.0 dBµV or less, it is possible to suppress a communication error while securing a long transmissible distance.

According to the optical transmission system of the present invention including the electro-optical conversion device of the present invention, since the electro-optical conversion device includes a light source capable of emitting light at output of 0.8 mW or more, and FWHM is 7.8 µm or more, or SM similarity of the light source is 0.85 or more, it is possible to suppress a communication error while securing a long transmissible distance.

BRIEF DESCRIPTION OF THE DRAWINGS

FIG. 1 shows a schematic diagram of one embodiment of an optical transmission system of the present invention.

FIG. 2A illustrating a baseline BL and a maximum intensity graph MAX-GF, and

FIG. 2B illustrating a graph GF, an average value AVE, and the noise index.

FIG. 3A illustrating a first waveform WF1 including a first peak P1,

FIG. 3B illustrating a second waveform WF2 including a second peak P2, and

FIG. 3C illustrating the maximum intensity graph MAX-GF including the first peak P1 and the second peak P2.

FIG. 7 shows a view obtained by plotting the relationship between FWHM and SM similarity in Examples 2 to 10 and Comparative Examples 3 to 6.

DESCRIPTION OF EMBODIMENTS

Figure 2A:
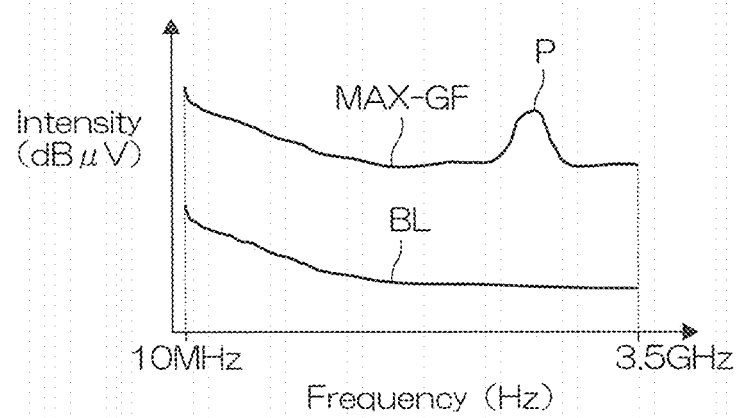
FIGS. 2A to 2B show graphs in which a noise index is obtained by a measurement method.

One embodiment of an optical transmission system of the present invention is described with reference to FIG. 1.

As shown in FIG. 1, an optical transmission system 1 which is one embodiment of the optical transmission system of the present invention transmits an RF signal by a frequency division multiplexing method.

The RF signal is not particularly limited as long as it is an electromagnetic wave having a frequency band used for wireless communication. Examples thereof include radio waves of television broadcasting and preferably, a BS signal used in BS broadcasting, a signal used in CS broadcasting, a CA-TV signal used in cable television broadcasting, and a terrestrial signal used in digital terrestrial broadcasting are used. These plurality of frequency bands may be appropriately used in combination.

The frequency division multiplexing method is a method in which after carrying out modulation at a specific frequency in the RF signal, these are multiplexed in parallel on the frequency axis, and a plurality of channels are transmitted in one optical fiber 3 (described later).

Examples of a modulation method at each frequency include methods such as FM (frequency modulation: Frequency Modulation), QAM (quadrature phase amplitude modulation: Quadrature Amplitude Modulation), OFDM (quadrature frequency division multiplexing method: Orthogonal Frequency Division Multiplexing), PSK (phase shift keying modulation: Phase Shift Keying), and APSK (amplitude phase shift keying modulation: Amplitude Phase Shift Keying).

The optical transmission system 1 includes a TOSA 2 as one example of an electro-optical conversion device, the optical fiber 3 as one example of an optical transmission line, and an ROSA 4 as one example of an opto-electrical conversion device.

The TOSA 2 is an optical transmission subassembly (Transmitter Optical SubAssembly). The TOSA 2 is provided at the upstream side end portion in a transmission direction of light in the optical transmission system 1. The TOSA 2 is a device that receives an RF signal, converts it into an optical signal, and transmits it. The TOSA 2 includes a stem 11, a submount 12, a surface emitting laser diode 13 as one example of a light source, a cap 14, and a receptacle 15. As the stem 11, the submount 12, the cap 14, and the receptacle 15, those equipped in a known TOSA are used.

The RF signal from an RF signal primary receiving device 56 (phantom line) such as an RF signal antenna (specifically, a television broadcasting antenna) is input into the stem 11. The stem 11 integrally has a base 21, a pin 22, and an insulating filler 38.

The base 21 has one surface and the other surface which are disposed to face each other at spaced intervals in a thickness direction, and specifically, has a generally disc shape. An example of a material for the base 21 includes a conductor such as metal. In the base 21, a through hole 37 penetrating in the thickness direction is provided corresponding to the pin 22.

The pin 22 has a generally rod shape extending along the thickness direction of the base 21, and penetrates through the through hole 37. An example of a material for the pin 22 includes the same material as that for the base 21. A wire 32 to be described later is connected to one end portion of the pin 22. The RF signal primary receiving device 56 is connected to the other end portion of the pin 22.

The insulating filler 38 fills the through hole 37 so as to cover an intermediate portion in a longitudinal direction of the pin 22 inserted into the through hole 37.

The submount 12 is disposed on one surface of the base 21 of the stem 11. Further, the submount 12 is disposed at the inside in a plane direction of one end portion of the pin 22. The submount 12 has a generally sheet (plate) shape along one surface of the base 21.

The surface emitting laser diode 13 is disposed on one surface of the submount 12. The surface emitting laser diode 13 has a generally rectangular parallelepiped shape, and has one surface and the other surface in the thickness direction. In the surface emitting laser diode 13, the other surface faces the submount 12, and one surface faces one side in the thickness direction. The surface emitting laser diode 13 has a terminal (not shown), and an emission port 26 of light in one surface thereof.

As the surface emitting laser diode 13, a light source having high (specifically, 0.85 or more) SM similarity (described later) is selected, and thus, it is possible to reduce a mode competition noise (described later), and reduce noise derived from a higher mode (described later) itself.

The terminal which is not shown is wire-bonded to one end portion of the pin 22 via the wire 32.

The emission port 26 is spaced apart from the terminal at the inside in the plane direction. The emission port 26 faces one side in the thickness direction of the surface emitting laser diode 13 and has a generally circular shape when viewed from the top.

A beam diameter (FWHM) of the surface emitting laser diode 13 emitted from the emission port 26 of the light is appropriately adjusted in accordance with the output of the surface emitting laser diode 13 to be described next, and is, for example, 3 µm or more, preferably 5 µm or more, and for example, 20 µm or less. The beam diameter (FWHM) of the surface emitting laser diode 13 is obtained by near-field pattern (Near Field Pattern: NFP) measurement.

When the beam diameter (FWHM) of the surface emitting laser diode 13 emitted from the emission port 26 of the light is the above-described lower limit or more, it is possible to adjust a ratio to be described later within a desired range.

Further, the surface emitting laser diode 13 includes, for example, an active layer (resonator layer including a light emitting layer), and a distribution Bragg reflection (DBR) layer. A thickness, a size (dimension in the plane direction), the refractive index, and the like of the active layer and the DBR layer are appropriately adjusted corresponding to a ratio to be described later in one embodiment.

The surface emitting laser diode 13 is configured to be capable of emitting light at output of 0.8 mW or more. On the other hand, when the surface emitting laser diode 13 is configured to be capable of emitting light at output of below 0.8 mW, it is impossible to secure a long transmissible distance of the optical transmission system 1.

Preferably, the surface emitting laser diode 13 is configured to be capable of emitting light at output of 1.0 mW or more, preferably 1.5 mW or more, more preferably 2.0 mW or more, further more preferably 2.5 mW or more. Also, the surface emitting laser diode 13 is configured to be capable of emitting light at output of 5 mW or less.

Further, the surface emitting laser diode 13 is configured to be in a specification of, for example, 50 Mbps or more, preferably 77 Mbps or more, and for example, 20 Gbps or less, preferably 10 Gbps or less, more preferably 5 Gbps or less. When the specification of the surface emitting laser diode 13 is within the above-described range, it is possible to secure a long transmissible distance of the optical transmission system 1.

A wavelength band of the optical signal emitted from the surface emitting laser diode 13 is not particularly limited, and is, for example, 1100 nm or less, and 600 nm or more.

When the wavelength band of the optical signal emitted from the surface emitting laser diode 13 is 1100 nm or less, there is a tendency that a noise index to be described later becomes higher, and in one embodiment, it is possible to suppress the noise index. Further, even when the optical fiber 3 is a plastic optical fiber (POE), it is possible to secure a long transmissible distance.

On the other hand, when the wavelength band of the optical signal emitted from the surface emitting laser diode 13 is 600 nm or more, it is possible to secure a long transmissible distance regardless of the kind of the optical fiber 3.

A mode of the optical signal emitted from the surface emitting laser diode 13 may be any of a multi-mode and a single mode, and from the viewpoint of obtaining high output, and thus, a long transmissible distance, preferably, a multi-mode is used.

The cap 14 has a generally bottomed cylindrical shape. The cap 14 specifically includes a bottom wall 6 and a side wall 7.

The bottom wall 6 is spaced apart from the surface emitting laser diode 13 and the wire 32. Specifically, the bottom wall 6 has a generally disc shape, and faces the emission port 26 of the surface emitting laser diode 13 at the downstream side in an emission direction of the light. Examples of a material for the bottom wall 6 include transparent materials such as glass including quartz glass and synthetic glass. It is desirable to have an antireflection coating on both surfaces in the thickness direction of the bottom wall 6 or one surface thereof.

The side wall 7 has a generally cylindrical shape extending from the peripheral end of the bottom wall 6 toward the base 21. A free end surface of the side wall 7 is in contact with one surface of the base 21. Examples of a material for the side wall 7 include metals such as aluminum and stainless steel.

The receptacle 15 is, for example, made of a transparent material, and integrally includes a lens 27, an outer wall 28, and an optical fiber housing wall 29.

The lens 27 is disposed to face the bottom wall 6 of the cap 14 at spaced intervals thereto at the opposite side of the surface emitting laser diode 13. The lens 27 has a protruding surface which is curved so as to approach the bottom wall 6 toward the center in the plane direction, and a flat surface facing the protruding surface. The flat surface of the lens 27 is spaced apart from the protruding surface at one side in the thickness direction.

The outer wall 28 has a generally cylindrical shape extending from the peripheral end edge of the lens 27 toward the other side in the thickness direction of the lens 27. The inner-side surface of the outer wall 28 adheres to the outer-side surface of the side wall 7 of the cap 14 via an adhesive (UV curable adhesive and the like) 5.

The optical fiber housing wall 29 has a generally cylindrical shape extending from the peripheral end edge of the lens 27 toward one side in the thickness direction of the lens 27. The optical fiber housing wall 29 houses (fixes) the upper end portion in the transmission direction of the optical fiber via a first ferrule 33 (described later).

Examples of the TOSA 2 include commercially available products, and specifically, those equipped with the surface emitting laser diode 13 in a can package of TO-56 or TO-46 (both are manufactured by Optronscience, Inc.).

In the TOSA 2, the RF signal input into the stem 11 is input into the surface emitting laser diode 13 via the wire 32. Then, the RF signal is converted into the optical signal in the surface emitting laser diode 13. The optical signal is emitted (exits) from the emission port 26 of the surface emitting laser diode 13, passes through the bottom wall 6 and the lens 27 of the cap 14, and is transmitted (input) to the optical fiber 3.

The optical fiber 3 transmits the optical signal transmitted from the TOSA 2. The optical fiber 3 is made of a transparent material, and includes a core 35, and a clad 36 disposed on its peripheral surface (outer front surface in a direction perpendicular to the transmission direction of the light). The core 35 has, for example, a generally cylindrical shape. The clad 36 has a generally cylindrical shape sharing the central axis with the core 35. An inner diameter of the core 35 is, for example, 1 µm or more, and 500 µm or less. Both end surfaces in the transmission direction of the light in the optical fiber 3 are exposed. Further, the first ferrule 33 and a second ferrule 53 (described later) are disposed on the peripheral surface of both end portions in the transmission direction of the clad 36.

The first ferrule 33 has a generally cylindrical shape, and is interposed (inserted) between the inner surface of the optical fiber housing wall 29 and the peripheral surface of the upstream side end portion in the transmission direction of the clad 36. The upstream side end surface in the transmission direction of the light of the optical fiber 3 (incident surface of the light) is disposed to face the flat surface of the lens 27.

A length in the transmission direction of the optical fiber 3 (optical distance between both end surfaces) is not particularly limited. It is appropriately adjusted in accordance with the transmissible distance, and is, for example, 1 m or more, preferably 5 m or more, more preferably 10 m or more, and for example, 300 m or less.

The second ferrule 53 has the same configuration as the first ferrule 33.

Examples of the optical fiber 3 include a plastic optical fiber (POF) and a glass optical fiber. In particular, a GI (graded index)-type POF having a refractive index distribution is preferable.

The ROSA 4 is an optical receiving subassembly (Receiver Optical SubAssembly). The ROSA 4 is provided in the downstream side end portion in the transmission direction of the light in the optical transmission system 1. The ROSA 4 converts the optical signal transmitted from the optical fiber 3 into the RF signal, and transmits it. Examples of the ROSA 4 include known ones. The ROSA 4 includes, for example, a second stem 41, a second submount 42, a photo diode (PD) 43, a second cap 44, and a second receptacle 45, and the arrangement of each of these is generally symmetrical with respect to the corresponding stem 11, submount 12, surface emitting laser diode 13, cap 14, receptacle 15, and optical fiber 3 of the TOSA 2 described above.

The second cap 44 and the second receptacle 45 each have the same configuration as the cap 14 and the receptacle 15 of the TOSA 2. The photo diode 43 is an element for converting the optical signal transmitted from the optical fiber 3 into the RF signal. The second submount 42 and the second stem 41 output the RF signal converted by the photo diode 43 to an RF signal secondary receiving device 57 such as a television broadcasting receiving device (phantom line).

The RF signal secondary receiving device 57 may incorporate an amplifier 30 for amplifying the RF signal output from the ROSA 4. The amplifier 30 amplifies the intensity of all the signals (carrier wave) including the frequency at which the modulation is carried out.

In the optical transmission system 1, in the TOSA 2, the RF signal is converted into the optical signal to be input into the optical fiber 3, and the optical signal transmitted by the optical fiber 3 is input into the ROSA 4, and in the ROSA 4, the optical signal is converted into the RF signal.

Next, a noise index and a measurement method thereof are described in detail with reference to FIGS. 2A to 3C. In each graph of FIGS. 2A to 3C, the horizontal axis indicates the frequency, and the vertical axis indicates the intensity. A height of each graph and the like is drawn exaggeratedly for easy understanding of one embodiment of the present invention, and is different from the actual intensity.

In the optical transmission system 1, the noise index obtained by the measurement method including the following first to sixth steps is 10.0 dBµV or less.

First step: as shown in FIG. 1, a constant current source 70 is connected to the TOSA 2 at the upstream side in the transmission direction thereof, and a frequency analyzer (spectrum analyzer) 61 is connected to the ROSA 4 at the downstream side in the transmission direction thereof.

Second step: a constant current is input from the constant current source 70 to the TOSA 2, and at the same time, an electrical signal input from the ROSA 4 is analyzed with the frequency analyzer 61. Specifically, a waveform having a frequency on the horizontal axis and the intensity on the vertical axis is acquired with the frequency analyzer 61 3000 times in a frequency domain of 10 MHz to 3.5 GHz of the electrical signal every 0.02 seconds after the elapse of 60 seconds from the beginning of the input of the electrical signal by the constant current source 70, so that as shown in FIG. 2A, a baseline BL which is an average waveform of 10 times is obtained.

Third step: a waveform is obtained 3000 times with the frequency analyzer 61 every 0.02 seconds from the beginning of the input of the electrical signal by the constant current source 70, and a maximum intensity graph MAX-GF drawn as the maximum value of the intensity at each frequency in the 3000 waveforms is obtained.

Figure 2B:
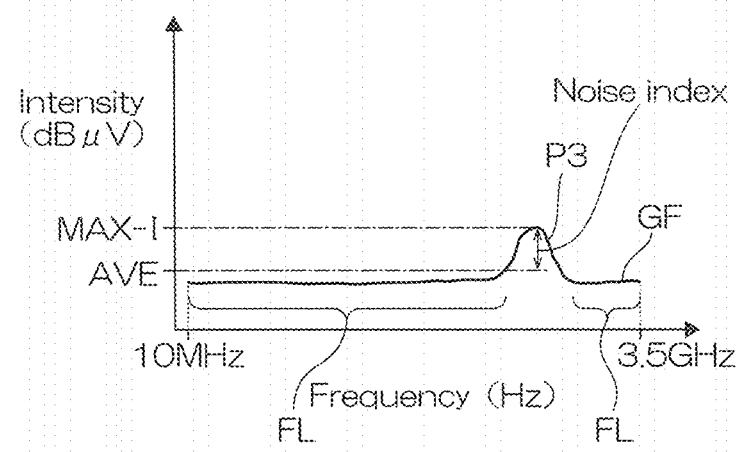

Fourth step: as shown in FIG. 2B, a graph GF obtained by subtracting the intensity of the baseline BL from the intensity of the maximum intensity graph MAX-GF is drawn with the frequency analyzer 61.

Fifth step: an average value AVE of the intensity for each specific frequency obtained by dividing the graph GF into 1000 in the frequency domain is calculated with the frequency analyzer 61.

Sixth step: a value obtained by subtracting the average valve AVE from the maximum intensity MAX-I in the graph GF with the frequency analyzer 61 is obtained as a noise index (unit: dBµV).

The first step to the sixth step described above can be sequentially carried out. Further, the first step to the sixth step described above can be carried out by an arithmetic operation device incorporated in the frequency analyzer 61.

As shown in FIG. 1, in the first step, the constant current source 70 is electrically connected to the other end portion of the pin 22, The frequency analyzer 61 is also electrically connected to the ROSA 4 via the RF signal secondary receiving device 57. The frequency analyzer 61 is a device which analyzes electrical signals consisting of a wide range of frequencies to know the frequency and the intensity thereof. As the frequency analyzer 61, a commercially available product can be used.

In the second step and the third step, a current value of the constant current which is input from the constant current source 70 into the TOSA 2 is not particularly limited as long as it is constant, and a constant value within a range of, for example, 1 mA or more, and for example, 1 A or less is appropriately selected.

When the acquisition of the 3000 waveforms and the baseline BL in the second step is carried out in the arithmetic operation device incorporated in the frequency analyzer 61, for example, the "acquisition average number" in the frequency analyzer 61 is set to 3000 times, and the baseline BL which is the average waveform is set to draw based on an arithmetic operation.

The baseline BL obtained in the second step is a component which does not substantially include noise in the frequency domain of 10 MHz to 3.5 GHz unlike the maximum intensity graph MAX-GF to be described next.

In the third step, the "maximum value of the intensity at each frequency in the 3000 waveforms" is a maximum value graph which records all the 3000 waveforms and reflects only the maximum value of the intensity at each frequency.

It is acceptable that the maximum intensity graph MAX-GF includes a predetermined peak P.

The peak P is generated by mixing an external signal (for example, PHS signal, cellular phone signal, WiFi signal, and the like) into the TOSA 2.

The peak P is a peak which is originally unnecessary in the optical transmission system 1, and inevitably appears due to the configuration of the optical transmission system 1.

The above-described peak P is usually recorded from the beginning of the input of the electrical signal, for example, after the acquisition of the baseline BL in the second step, specifically, after 60 seconds (=0.02 seconds×3000 times).

The intensity of the maximum intensity graph MAX-GF is higher than the intensity of the baseline BL at each frequency.

Figure 3A:
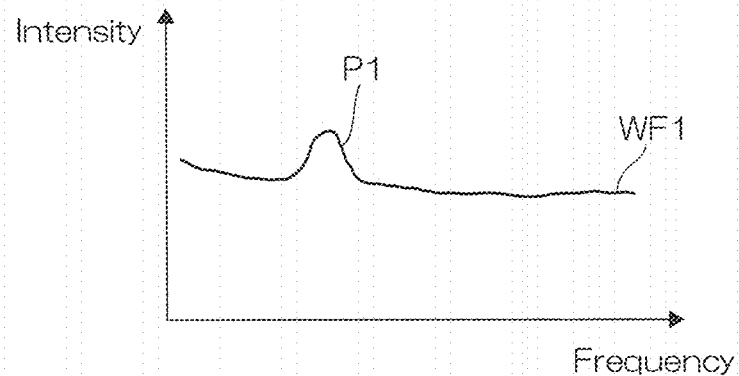
FIGS. 3A to 3C show views for illustrating a maximum intensity graph MAX-GF.
Figure 3B:
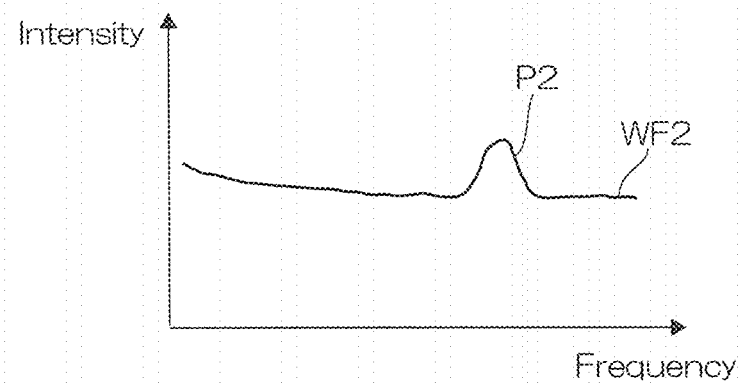
Figure 3C:
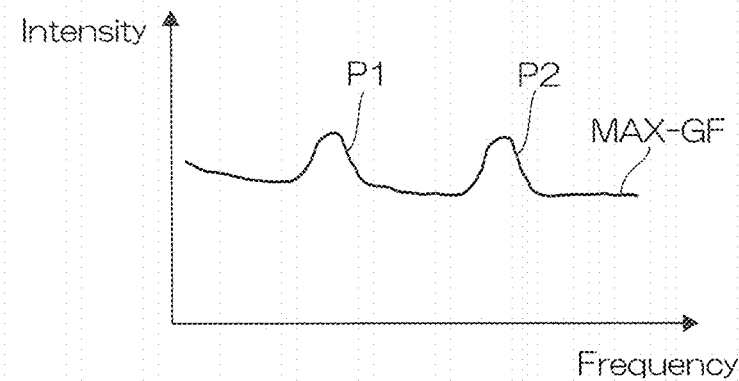

As shown in FIG. 3A, for example, a first waveform WF1 includes a first peak P1 at a frequency f1, and as shown in FIG. 3B, a second waveform WF2 includes a second peak P2 at a frequency f2 which is different from the frequency f1. When the first peak P1 is not included, both of the first waveform WF1 and the second waveform WF2 are recorded in the arithmetic operation device. Then, as shown in FIG. 3C, the maximum intensity graph MAX-GF includes the two peaks (the first peak P1 and the second peak P2) as components.

As shown in FIG. 2B, the graph GF drawn in the fourth step is obtained by subtracting the intensity of the baseline BL (ref: FIG. 2A) from the intensity of the maximum intensity graph MAX-GF (ref: FIG. 2A) at each frequency of the frequency domain of 10 MHz to 3.5 GHz. The intensity of the graph GF is plus (higher than 0) since the intensity of the maximum intensity graph MAX-GF is higher than the intensity of the baseline BL.

As shown in FIG. 2A, when the maximum intensity graph MAX-GF is a waveform including the peak P, and the baseline BL has a waveform similar to the maximum intensity graph MAX-GF in a region other than the peak P, as shown in FIG. 2B, the graph GF has a peak P3 corresponding to the peak P of the maximum intensity graph MAX-GF, and the region other than the peak P3 is a waveform of a flat line FL which is generally parallel to the frequency axis. In the fourth step, the graph GF is drawn by the arithmetic operation device incorporated in the frequency analyzer 61.

When the acquisition of the maximum intensity graph MAX-GF in the third step is carried out in the arithmetic operation device incorporated in the frequency analyzer 61, for example, the "acquisition average number" in the frequency analyzer 61 is set to 0 times, the waveform acquisition setting is set to "Max. hold" (maximum hold), and the maximum intensity graph MAX-GF is set to draw based on the arithmetic operation.

As shown on the vertical axis (intensity axis) of FIG. 2B, in the fifth step, the average value AVE of the intensity for each specific frequency obtained by dividing the graph GF into 1000 in the frequency domain of 10 MHz to 3.5 GHz is calculated. The specific frequency is obtained by dividing the frequency domain of 10 MHz to 3.5 GHz into 1000 on a common logarithm plot, and the number thereof is 1001. The specific frequency on the lowest frequency side is 10 MHz, the specific frequency on the highest frequency side is 3.5 GHz, and the number of the specific frequency between them is 999. An interval (measurement pitch) between the specific frequencies adjacent to each other is a value obtained by subtracting 10 MHz from 3.5 GHz and dividing the resulting value by 1000 in the common logarithm.

In the fifth step, the intensity for each specific frequency is obtained, and the average value AVE of these is obtained. As shown in FIG. 2B, when the graph GF has the peak P3 and the flat line FL, the average value AVE is located between the intensity of the peak P3 and the intensity of the flat line FL. In the fifth step, the average value AVE is, for example, calculated as the unit: dBµV with the arithmetic operation device.

In the sixth step, the noise index is calculated with the arithmetic operation device.

In order to set the noise index to 10.0 dBµV or less as described above, for example, specifically, a method of setting the beam diameter (FWHM) of the surface emitting laser diode 13 within the above-described range, a method of changing the beam intensity distribution (SM similarity) in the surface emitting laser diode 13, and a method of changing a thickness, a size (dimension in the plane direction), the refractive index, and the like of the active layer and the DBR layer in the surface emitting laser diode 13 are used.

The noise index is preferably 8 or less, more preferably 5 or less, further more preferably 3 or less, and for example, above 0.

In the optical transmission system 1 including the TOSA 2, the TOSA 2 includes the surface emitting laser diode 13 configured to be capable of emitting light at output of 0.8 mW or more, and the above-described noise index is 10.0 dBµV or less, so that it is possible to suppress a communication error while securing a long transmissible distance.

Modified Examples

In the modified examples, the same reference numerals are provided for members and steps corresponding to each of those in one embodiment, and their detailed description is omitted. Further, the modified examples can achieve the same function and effect as that of one embodiment unless otherwise specified. Furthermore, one embodiment and the modified examples thereof can be appropriately used in combination.

Further, in the above-described description, whether or not the optical transmission system 1 achieves the effect of the present invention is evaluated by the noise index. Alternatively, for example, whether or not the optical transmission system 1 achieves the effect of the present invention can be also evaluated by the beam diameter (FWHM) or the SM similarity of the surface emitting laser diode 13 (light source).

Specifically, the beam diameter (FWHM: full width at half maximum) obtained by the near-field pattern measurement of the surface emitting laser diode 13 is 7.8 µm or more, or the SM (single mode) similarity of the surface emitting laser diode 13 obtained by the measurement method including the following seventh to eleventh steps is 0.85 or more.

Figure 4:
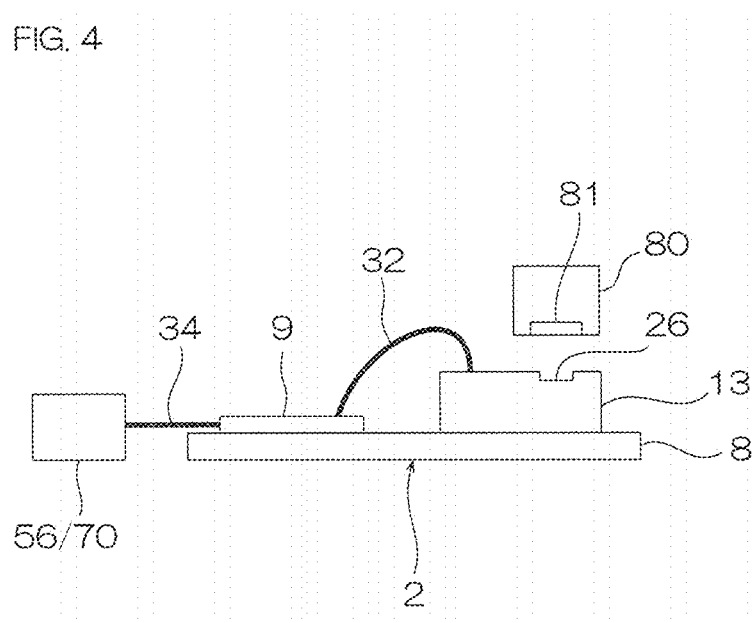
FIG. 4 shows a schematic diagram of a configuration used for measurement of FWHM and SM similarity of a surface emitting laser diode.

Seventh step: the constant current source 70 is connected to the surface emitting laser diode 13, and a light receiving portion 81 of a near-field pattern measurement device 80 is disposed in a position where the most light emitted from the surface emitting laser diode 13 enters the light receiving portion. As shown in FIG. 4, the near-field pattern measurement device 80 has a generally box shape, and includes the light receiving portion 81 on the lower surface thereof.

Figure 5:
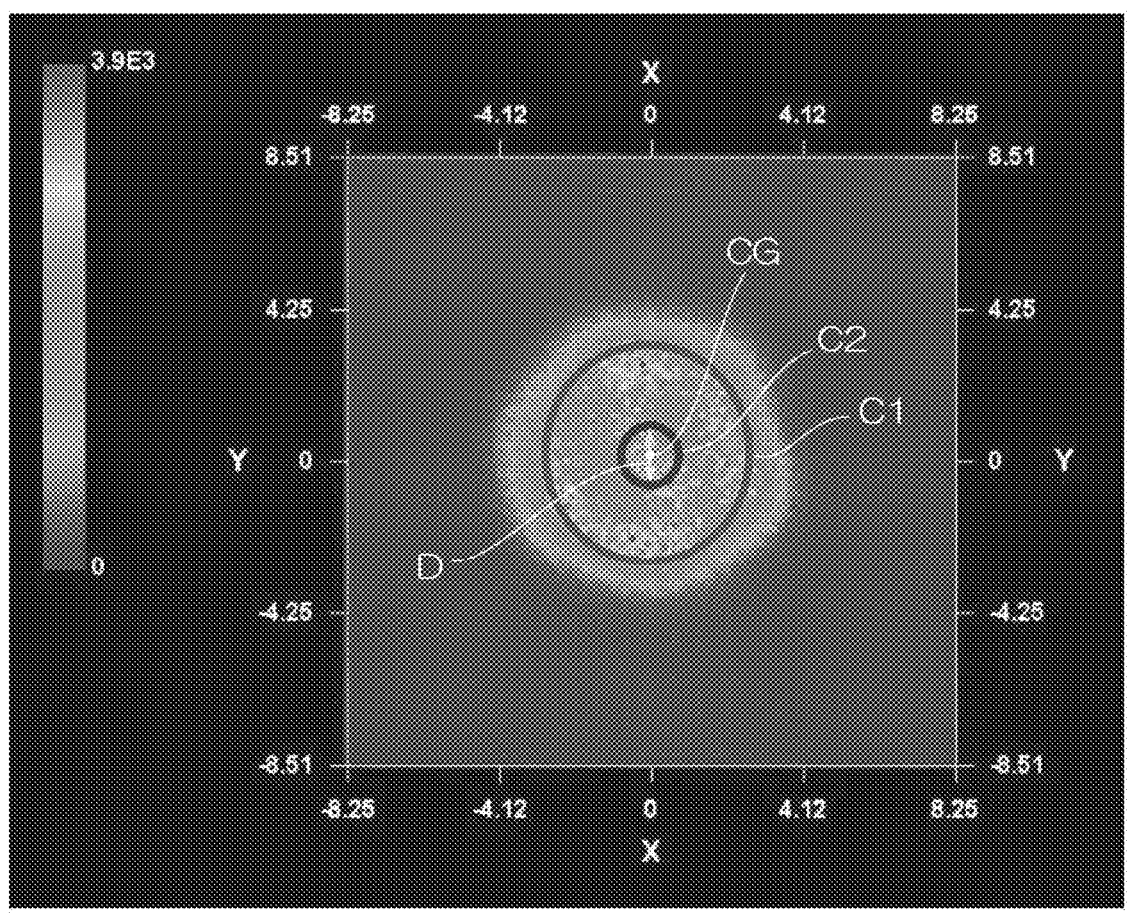
FIG. 5 shows a near-field pattern obtained by measurement of FWHM and SM similarity.

Eighth step: a constant current is input from the constant current source 70 to the surface emitting laser diode 13, and a beam diameter (FWHM) and a near-field pattern (intensity distribution) of the surface emitting laser diode 13 are measured with the near-field pattern measurement device after the elapse of 60 seconds to 180 seconds from the beginning of the input of an electrical signal by the constant current source 70, as shown in FIG. 5 are obtained.

Ninth step: an average value AV1 of the intensity in a first circle C1 with the center of gravity CG of the intensity distribution of the near-field pattern as the origin (0, 0), and having a diameter D of the beam diameter (FWHM) with the origin (0, 0) as a center in the near-field pattern is calculated.

Tenth step: an average value AV2 of the intensity in a second circle C2 having a diameter of 1 µm with the origin (0, 0) as a center in the near-field pattern is calculated.

Eleventh step: the SM similarity is calculated by dividing the average value AV2 calculated in the tenth step by the average value AV1 calculated in the ninth step.

That is, a value obtained by dividing the average value AV2 of the intensity in the second circle C2 by the average value AV1 of the intensity in the first circle C1 is the SM similarity.

Since the beam diameter obtained by the near-field pattern measurement of the surface emitting laser diode 13 is 7.8 µm or more, or the SM similarity of the surface emitting laser diode 13 obtained by the measurement method described above is 0.85 or more, in the optical transmission system 1, it is possible to suppress a communication error while securing a long transmissible distance.

Also, since the SM similarity is as high as 0.85 or more, it is possible to increase the influence of a basic mode. In other words, since the SM similarity is as high as 0.85 or more, it is possible to weaken the influence of a higher mode. Therefore, it is possible to reduce a mode competition noise that is competitive between the basic mode and the higher mode.

Furthermore, since the SM similarity is as high as 0.85 or more, it is possible to reduce noise derived from the higher mode itself.

A beam diameter is preferably 8.0 µm or more, more preferably 8.25 µm or more, further more preferably 8.5 µm or more, particularly preferably 9.0 µm or more, most preferably 12.25 µm or more, even more preferably 13.0 µm or more. Also, the beam diameter is, for example, 1000 µm or less.

When the beam diameter is the above-described lower limit or more, it is possible to reduce the mode competition noise.

The beam diameter and the SM similarity described above may not be correlated. For example, as shown in FIG. 7, of Example 10 and Comparative Example 4 having a beam diameter that approximates to each other, the SM similarity of Example 10 is 0.95 which is within the scope of the present invention. On the other hand, the SM similarity of Comparative Example 4 is 0.75 which is outside the scope of the present invention.

Further, the SM similarity is preferably 0.90 or more, more preferably 0.93 or more, further more preferably 1.0 or more, particularly preferably 1.1 or more. Also, the SM similarity is 10 or less.

In the modified example, it is also possible to configure the optical transmission system 1 without incorporating the amplifier 30 into the RF signal secondary receiving device 57. In the optical transmission system 1, the intensity of the maximum intensity graph MAX-GF including a predetermined peak is reduced, and the intensity of the baseline BL is also reduced at the same rate. Then, as a result, there is no variation in the noise index described above regardless of a presence or absence of the amplifier 30.

Also, in the modified example, as the surface emitting laser diode 13, a light source having the SM similarity of as high as 0.85 or more is selected. Thus, it is possible to reduce the mode competition noise, and reduce the noise derived from the higher mode itself.

In one embodiment, as one example of a light source, the surface emitting laser diode 13 is used. However, the light source is not particularly limited as long as it is a light source which is capable of reducing the noise index including the noise described above. For example, another light source, and specifically, a side emitting laser diode can be also used. As one example of a light source, preferably, the surface emitting laser diode 13 is used. The surface emitting laser diode 13 can emit an optical signal having high output. On the other hand, when the light source is the surface emitting laser diode 13, there is a tendency that the noise index is increased, and in one embodiment, it is possible to suppress the noise index by the above-described method (for example, a method of setting the beam diameter (described later) of the surface emitting laser diode 13 within the above-described range and the like).

In one embodiment, in the TOSA 2, the RF signal input into the stem 11 is input into the surface emitting laser diode 13 via the wire 32. However, in the modified example, a portion of the RF signal may be input into the surface emitting laser diode 13 via the submount 12.

Figure 6:
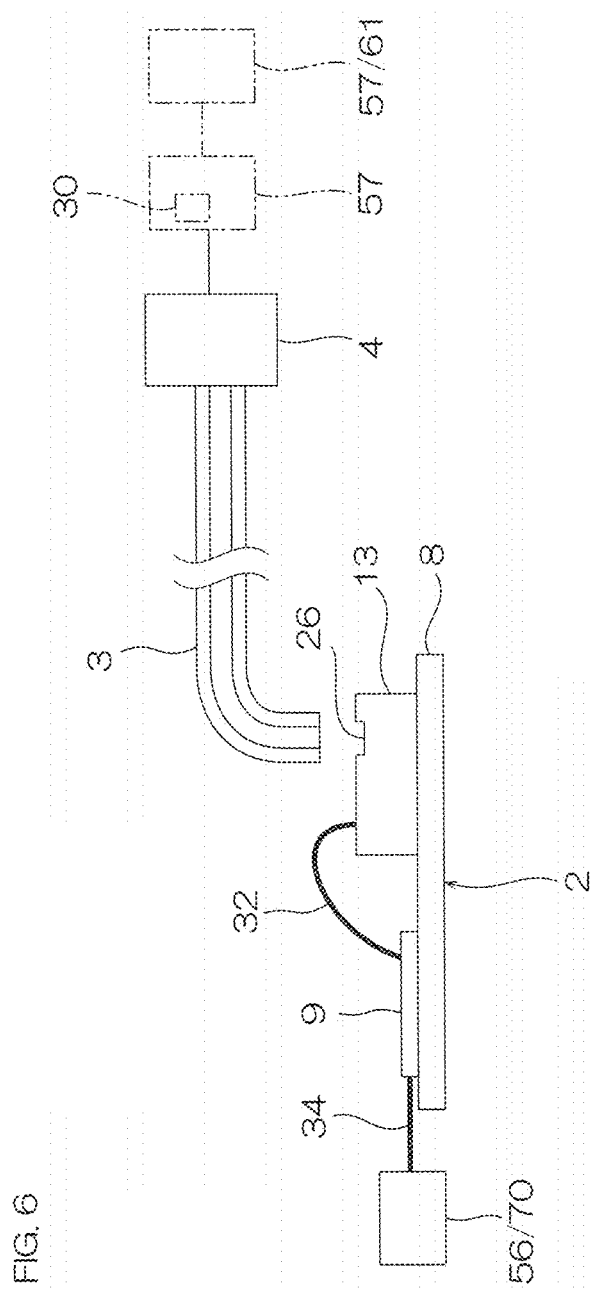
FIG. 6 shows a schematic diagram of a modified example of the optical transmission system shown in FIG. 1.

Further, the TOSA 2 is not limited to the above-described configuration as long as it includes the surface emitting laser diode 13. For example, as shown in FIG. 6, in the TOSA 2, the surface emitting laser diode 13 may be mounted on an FPC (flexible printed circuit board) 8. That is, the TOSA 2 includes the FPC 8 and the surface emitting laser diode 13.

The FPC 8 has a generally plate shape having one surface and the other surface facing each other in the thickness direction. A terminal 9 is provided on one surface of the FPC 8. The terminal 9 is connected to the RF signal primary receiving device 56 via the wire 34.

The surface emitting laser diode 13 is mounted on one surface of the FPC 8 at spaced intervals to the terminal 9 in the plane direction.

The emission port 26 of the surface emitting laser diode 13 faces one end surface of the optical fiber 3.

Further, in the measurement method of the noise index using the TOSA 2 including the FPC 8, in the first step, the constant current source 70 is electrically connected to the FPC 8 via the wire 34.

The noise index, the FWHM, and the SM similarity measured in the configuration of the modified example are substantially the same as those measured in the description above.

EXAMPLES

Next, the present invention is further described based on Examples and Comparative Examples shown below. The present invention is however not limited by these Examples and Comparative Examples. The specific numerical values in mixing ratio (ratio), property value, and parameter used in the following description can be replaced with upper limit values (numerical values defined as "or less" or "below") or lower limit values (numerical values defined as "or more" or "above") of corresponding numerical values in mixing ratio (ratio), property value, and parameter described in the above-described "DESCRIPTION OF EMBODIMENTS".

Example 1 and Comparative Example 1

(Fabrication of Optical Transmission System Corresponding to One Embodiment of FIG. 1 and Measurement of Noise Index)

As shown in FIG. 1, the optical transmission system 1 including the TOSA 2, the optical fiber 3, and the ROSA 4 was prepared.

An emission diameter, a wavelength band, a specification, an output mode of light, and output of the surface emitting laser diode 13 in the TOSA 2 were as described in Table 1.

The optical fiber 3 was a GI-type glass optical fiber. An inner diameter of the core 36 was 50

As the ROSA 4, TO-56 (manufactured by Optronscience, Inc.) was used.

A noise index was obtained by the above-described measurement method including the first to sixth steps. The results are shown in Table 1.

In the first step, the constant current source 70 was connected to the TOSA 2. Further, Single Analyzer N9000A manufactured by Keysight Technologies as the frequency analyzer 61 was connected to the ROSA 4 via the RF signal secondary receiving device 57.

Evaluation of Optical Transmissible Distance and Communication Error in Optical Transmission System An optical transmissible distance and a communication error in each of the optical transmission systems of Example 1 and Comparative Example 1 were evaluated in accordance with the following criteria. The results are shown in Table 1.

Good: the output was 0.8 mW or more, and the noise index was 10.0 dBµV or less.

Bad: the output was below 0.8 mW, or the noise index was above 10.0 dBµV.

In addition, by changing to the configuration of disposing the near-field pattern measurement device 80 with respect to the surface emitting laser diode 13 (configuration corresponding to the modified example of FIG. 4), the FWHM and the SM similarity were calculated, and the optical transmissible distance and the communication error were evaluated.

Good: the output was 0.8 mW or more, and the FWHM was 7.8 µm or more. Or, the output was 0.8 mW or more, and the SM similarity was 0.85 or more.

Bad: the output was 0.8 mW or more, the FWHM was below 7.8 µm, and the SM similarity was below 0.85.

Examples 2 to 10 and Comparative Examples 2 to 6

(Fabrication of Optical Transmission System Corresponding to Modified Example of FIG. 6 and Measurement of Noise Index)

As shown in FIG. 6, the optical transmissible distance and the communication error were evaluated in accordance with the following criteria in the same manner as in Example 1, except that the configuration of the TOSA 2 was changed to the surface emitting laser diode 13 mounted on the FPC 8. The results are shown in Table 2.

Good: the output was 0.8 mW or more, and the noise index was 10.0 dBµV or less.

Bad: the output was below 0.8 mW, or the noise index was above 10.0 dBµV.

Separately, as shown in FIG. 4, the near-field pattern measurement device 80 was disposed instead of the optical fiber 3, the FWHM and the SM similarity were calculated, and the optical transmissible distance and the communication error were evaluated in accordance with the following criteria.

Good: the output was 0.8 mW or more, and the FWHM was 7.8 µm or more. Or, the output was 0.8 mW or more, and the SM similarity was 0.85 or more.

Bad: the output was below 0.8 mW.

Or, though the output was 0.8 mW or more, the FWHM was below 7.8 µm, and the SM similarity was below 0.85.

A kind and the like of the surface emitting laser diode 13, and the evaluation result are shown in Table 2. Further, the relationship between the beam diameter (FWHM) and the SM similarity in Examples 2 to 10 and Comparative Examples 3 to 6 is shown in FIG. 7. In FIG. 7, a hatched region is the scope of the invention of claim 2 in which the beam diameter is 7.8 µm or more, or the SM (single mode) similarity is 0.85 or more.

TABLE 1

| | Surface Emitting Laser Diode[*1] | | | | | | | Evaluation of |
|---|---|---|---|---|---|---|---|---|
| | Wavelength Band (nm) | Specification (GHz) | Output Mode | Output (mW) | NFP Diameter (FWHM) [µm] | SM Similarity | Noise Index (dBµV) | Transmissible Distance and Communication Error of Optical Transmission System |
| Ex. 1 | 850 | 4 | Multi | 2.2 | 13.2 | 0.87 | 6 | Good |
| Comparative Ex. 1 | 850 | 10 | Multi | 2.9 | 7.6 | 0.73 | 13 | Bad |

[*1]Surface emitting laser diode: submount-mounted type

TABLE 2

| | Surface Emitting Laser Diode[*2] | | | | | | | Evaluation of |
|---|---|---|---|---|---|---|---|---|
| | Wavelength Band (nm) | Specification [Gbps] | Output Mode | Output (mW) | NFP Diameter (FWHM) [µm] | SM Similarity | Noise Index (dBµV) | Transmissible Distance and Communication Error of Optical Transmission System |
| Ex. 2 | 850 | 10 | Multi | 2.5 | 7.3 | 1.2 | 3 | Good |
| Ex. 3 | 850 | 14 | Multi | 1.9 | 6.58 | 1.07 | 3 | Good |
| Ex. 4 | 850 | 14 | Multi | 2.9 | 6.58 | 0.94 | 2 | Good |
| Ex. 5 | 850 | 10 | Multi | 2.2 | 7.25 | 0.92 | 4 | Good |
| Ex. 6 | 850 | 10 | Multi | 3.3 | 6.37 | 0.9 | 10 | Good |
| Ex. 7 | 850 | 4 | Multi | 2.2 | 13.19 | 0.87 | 6 | Good |
| Ex. 8 | 850 | 6 | Multi | 2.4 | 8.55 | 0.81 | 7 | Good |
| Ex. 9 | 850 | 6 | Multi | 1.8 | 8.17 | 0.69 | 7 | Good |

TABLE 2-continued

| | Surface Emitting Laser Diode[*2] | | | | | | Evaluation of |
| --- | --- | --- | --- | --- | --- | --- | --- |
| | Wavelength Band (nm) | Specification [Gbps] | Output Mode | Output (mW) | NFP Diameter (FWHM) [μm] | SM Similarity | Noise Index (dBμV) | Transmissible Distance and Communication Error of Optical Transmission System |
| Ex. 10 | 850 | 1 | Single | 1.7 | 4.43 | 0.95 | 4 | Good |
| Comparative Ex. 2 | 850 | 1 | Single | 0.5 | 3.37 | 1.29 | 3 | Bad |
| Comparative Ex. 3 | 850 | 14 | Multi | 2.8 | 6.99 | 0.8 | 11 | Bad |
| Comparative Ex. 4 | 850 | 1 | Multi | 3.1 | 4.45 | 0.75 | 12 | Bad |
| Comparative Ex. 5 | 850 | 10 | Multi | 2.8 | 6.19 | 0.73 | 11 | Bad |
| Comparative Ex. 6 | 850 | 10 | Multi | 2.9 | 7.61 | 0.73 | 13 | Bad |

[*2]Surface emitting laser diode: FPC-mounted type

While the illustrative embodiments of the present invention are provided in the above description, such is for illustrative purpose only and it is not to be construed as limiting the scope of the present invention. Modification and variation of the present invention that will be obvious to those skilled in the art is to be covered by the following claims.

INDUSTRIAL APPLICATION

The optical transmission system of the present invention is provided in an electro-optical conversion device.

DESCRIPTION OF REFERENCE NUMBER

1 Optical transmission system
2 TOSA
3 Optical fiber
4 ROSA
13 Surface emitting laser diode
61 Frequency analyzer
70 Constant current source
80 Near-field pattern measurement device
81 Light receiving portion
BL Baseline
MAX-GF Maximum intensity graph
AVE Average value
CG Center of gravity of intensity distribution
FWHM Beam diameter
C1 First circle
C2 Second circle
AV1 Average value of intensity in first circle (calculated in ninth step)
AV2 Average value of intensity in second circle (calculated in tenth step)

The invention claimed is:
1. An optical transmission system for transmitting an RF signal by a frequency division multiplexing method comprising:
an electro-optical conversion device for receiving an RF signal, converting the RF signal into an optical signal, and transmitting the optical signal,
an optical transmission line for transmitting the optical signal transmitted from the electro-optical conversion device, and
an opto-electrical conversion device for converting the optical signal transmitted from the optical transmission line into an RF signal and transmitting the RF signal, wherein
the electro-optical conversion device includes a light source capable of emitting light at output of 0.8 mW or more, and
a noise index obtained by a measurement method including the following first to sixth steps is 10.0 dB μV or less:
first step: a constant current source is connected to the electro-optical conversion device at the upstream side in a transmission direction thereof, and a frequency analyzer is connected to the opto-electrical conversion device at the downstream side in the transmission direction thereof;
second step: a constant current is input from the constant current source to the electro-optical conversion device, and at the same time, an electrical signal input from the opto-electrical conversion device is analyzed with the frequency analyzer, and a waveform having a frequency on the horizontal axis and the intensity on the vertical axis is acquired with the frequency analyzer 3000 times in a frequency domain of 10 MHz to 3.5 GHz of the electrical signal every 0.02 seconds after the elapse of 60 seconds from the beginning of the input of the electrical signal by the constant current source, so that a baseline which is an average waveform of 3000 times is obtained;
third step: a waveform is obtained 3000 times with the frequency analyzer every 0.02 seconds from the beginning of the input of the electrical signal by the constant current source, and a maximum intensity graph drawn as the maximum value of the intensity at each frequency in the 3000 waveforms is obtained;
fourth step: a graph obtained by subtracting the intensity of the baseline from the intensity of the maximum intensity graph is drawn with the frequency analyzer;
fifth step: an average value of the intensity for each specific frequency obtained by dividing the graph into 1000 in the frequency domain is calculated with the frequency analyzer; and
sixth step: a value obtained by subtracting the average value from the maximum intensity in the graph with the frequency analyzer is obtained as a noise index (unit: dBμV).

2. The optical transmission system according to claim 1, wherein
a wavelength band of an optical signal emitted from the light source is 1100 nm or less.

3. The optical transmission system according to claim 1, wherein
the light source is a surface emitting laser diode.

4. The optical transmission system according to claim 1, wherein
the light source has a specification of 50 Mbps or more and 20 Gbps or less.

5. The optical transmission system according to claim 1, wherein
the RF signal is a BS signal, a CS signal, a CA-TV signal, and/or a terrestrial signal.

6. An optical transmission system for transmitting an RF signal by a frequency division multiplexing method comprising:
an electro-optical conversion device for receiving an RF signal, converting the RF signal into an optical signal, and transmitting the optical signal,
an optical transmission line for transmitting the optical signal transmitted from the electro-optical conversion device, and
an opto-electrical conversion device for converting the optical signal transmitted from the optical transmission line into an RF signal and transmitting the RF signal, wherein
the electro-optical conversion device includes a light source capable of emitting light at output of 0.8 mW or more, and
a beam diameter (FWHM: full width at half maximum) obtained by near-field pattern measurement of the light source is 7.8 μm or more, or SM (single mode) similarity of the light source obtained by a measurement method including the following seventh to eleventh steps is 0.85 or more:
seventh step: a constant current source is connected to the light source, and a light receiving portion of a near-field pattern measurement device is disposed in a position where the most light emitted from the light source enters the light receiving portion;
eighth step: a constant current is input from the constant current source to the light source, and a beam diameter (FWHM) and a near-field pattern (intensity distribution) of the light source are measured with the near-field pattern measurement device after the elapse of 60 seconds to 180 seconds from the beginning of the input of an electrical signal by the constant current source, and obtained;
ninth step: an average value of the intensity in a circle with the center of gravity of the intensity distribution of the near-field pattern as the origin (0, 0), and having a diameter of the beam diameter (FWHM) with the origin as a center in the near-field pattern is calculated;
tenth step: an average value of the intensity in a circle having a diameter of 1 μm with the origin (0, 0) as a center in the near-field pattern is calculated; and
eleventh step: the SM similarity is calculated by dividing the average value calculated in the tenth step by the average value calculated in the ninth step.

7. An electro-optical conversion device in an optical transmission system for transmitting an RF signal by a frequency division multiplexing method, the optical transmission system for transmitting comprising:
the electro-optical conversion device for receiving an RF signal, converting the RF signal into an optical signal, and transmitting the optical signal;
an optical transmission line for transmitting the optical signal transmitted from the electro-optical conversion device; and
an opto-electrical conversion device for converting the optical signal transmitted from the optical transmission line into an RF signal and transmitting the RF signal, wherein
the RF signal is capable of being converted into an optical signal,
the electro-optical conversion device includes a light source capable of emitting light at output of 0.8 mW or more, and
a noise index obtained by a measurement method including the following first to sixth steps is 10.0 dB μV or less;
first step: a constant current source is connected to the electro-optical conversion device at the upstream side in a transmission direction thereof, and a frequency analyzer is connected to the opto-electrical conversion device at the downstream side in the transmission direction thereof;
second step: a constant current is input from the constant current source to the electro-optical conversion device, and at the same time, an electrical signal input from the opto-electrical conversion device is analyzed with the frequency analyzer, and a waveform having a frequency on the horizontal axis and the intensity on the vertical axis is acquired with the frequency analyzer 3000 times in a frequency domain of 10 MHz to 3.5 GHz of the electrical signal every 0.02 seconds after the elapse of 60 seconds from the beginning of the input of the electrical signal by the constant current source, so that a baseline which is an average waveform of 3000 times is obtained;
third step: a waveform is obtained 3000 times with the frequency analyzer every 0.02 seconds from the beginning of the input of the electrical signal by the constant current source, and a maximum intensity graph drawn as the maximum value of the intensity at each frequency in the 3000 waveforms is obtained;
fourth step: a graph obtained by subtracting the intensity of the baseline from the intensity of the maximum intensity graph is drawn with the frequency analyzer;
fifth step: an average value of the intensity for each specific frequency obtained by dividing the graph into 1000 in the frequency domain is calculated with the frequency analyzer; and
sixth step: a value obtained by subtracting the average value from the maximum intensity in the graph with the frequency analyzer is obtained as a noise index (unit: dBμV).

8. The electro-optical conversion device according to claim 7, wherein
a wavelength band of an optical signal emitted from the light source is 1100 nm or less.

9. The electro-optical conversion device according to claim 7, wherein
the light source is a surface emitting laser diode.

10. An electro-optical conversion device in an optical transmission system for transmitting an RF signal by a frequency division multiplexing method, the optical transmission system for transmitting comprising:

the electro-optical conversion device for receiving an RF signal, converting the RF signal into an optical signal, and transmitting the optical signal;

an optical transmission line for transmitting the optical signal transmitted from the electro-optical conversion device; and an opto-electrical conversion device for converting the optical signal transmitted from the optical transmission line into an RF signal and transmitting the RF signal, wherein the RF signal is capable of being converted into an optical signal, the electro-optical conversion device includes a light source capable of emitting light at output of 0.8 mW or more, and a beam diameter (FWHM: full width at half maximum) obtained by near-field pattern measurement of the light source is 7.8 µm or more, or SM (single mode) similarity of the light source obtained by a measurement method including the following seventh to eleventh steps is 0.85 or more:

seventh step: a constant current source is connected to the light source, and a light receiving portion of a near-field pattern measurement device is disposed in a position where the most light emitted from the light source enters the light receiving portion;

eighth step: a constant current is input from the constant current source to the light source, and a beam diameter (FWHM) and a near-field pattern (intensity distribution) of the light source are measured with the near-field pattern measurement device after the elapse of 60 seconds to 180 seconds from the beginning of the input of an electrical signal by the constant current source, and obtained;

ninth step: an average value of the intensity in a circle with the center of gravity of the intensity distribution of the near-field pattern as the origin (0, 0), and having a diameter of the beam diameter (FWHM) with the origin as a center in the near-field pattern is calculated;

tenth step: an average value of the intensity in a circle having a diameter of 1 µm with the origin (0, 0) as a center in the near-field pattern is calculated; and eleventh step: the SM similarity is calculated by dividing the average value calculated in the tenth step by the average value calculated in the ninth step.

* * * * *